(12) United States Patent
Waite

(10) Patent No.: US 10,730,606 B2
(45) Date of Patent: Aug. 4, 2020

(54) SYSTEMS, METHODS, AND APPARATUSES FOR AIRFOIL CONFIGURATION IN AIRCRAFT

(71) Applicant: Josh Waite, Palmer, AK (US)

(72) Inventor: Josh Waite, Palmer, AK (US)

( * ) Notice: Subject to any disclaimer, the term of this patent is extended or adjusted under 35 U.S.C. 154(b) by 611 days.

(21) Appl. No.: 15/136,989

(22) Filed: Apr. 25, 2016

(65) Prior Publication Data

US 2016/0311521 A1  Oct. 27, 2016

Related U.S. Application Data

(60) Provisional application No. 62/152,460, filed on Apr. 24, 2015.

(51) Int. Cl.
| | |
|---|---|
| *B64C 9/14* | (2006.01) |
| *B64C 3/48* | (2006.01) |
| *B64C 21/02* | (2006.01) |
| *B64C 3/14* | (2006.01) |
| *B64C 29/00* | (2006.01) |

(52) U.S. Cl.
CPC ............... *B64C 9/14* (2013.01); *B64C 3/48* (2013.01); *B64C 21/025* (2013.01); *B64C 29/0025* (2013.01); *B64C 2003/143* (2013.01); *B64C 2230/20* (2013.01); *Y02T 50/12* (2013.01); *Y02T 50/14* (2013.01); *Y02T 50/166* (2013.01); *Y02T 50/32* (2013.01)

(58) Field of Classification Search
CPC ....... B64C 3/38; B64C 2003/143; B64C 9/14; B64C 9/30; B64C 21/025; B64C 29/0025; B64C 2230/20; Y02T 50/12; Y02T 50/14

USPC ............ 244/6, 45 R, 46, 198, 201, 204
See application file for complete search history.

(56) References Cited

U.S. PATENT DOCUMENTS

| | | | | |
|---|---|---|---|---|
| 1,810,693 | A * | 6/1931 | Heraclio | B64C 21/02 244/204 |
| 1,858,341 | A * | 5/1932 | Richart | B64C 21/02 244/198 |
| 1,876,635 | A * | 9/1932 | Deutscher | B64C 21/02 244/198 |
| 1,979,184 | A * | 10/1934 | Ziegler | B64C 23/00 244/204 |
| 2,077,070 | A * | 4/1937 | Rose | B64C 21/02 244/204 |
| 2,267,927 | A * | 12/1941 | Kightlinger | B64C 21/025 244/200 |
| 2,348,252 | A * | 5/1944 | Griswold | B64C 21/025 244/211 |
| 2,587,359 | A * | 2/1952 | Milans | B64C 21/02 244/204 |
| 2,646,945 | A * | 7/1953 | Perry | B64C 21/025 244/204 |
| 3,010,680 | A * | 11/1961 | Kaplan | B64C 21/00 244/207 |

(Continued)

*Primary Examiner* — Richard R. Green
*Assistant Examiner* — Brady W Frazier

(57) ABSTRACT

The present set of embodiments relate to systems, methods, and apparatuses for airfoil systems designed for aircraft or other craft. More specifically, the present disclosure includes various embodiments of airfoils that include fixed or adjustable louvers that allow the airfoil to adapt to various conditions including angle or attack and airspeed. Such airfoil systems increase the dynamic range or airfoils by maximizing lift or minimizing drag depending on the conditional requirements.

11 Claims, 7 Drawing Sheets

(56) References Cited

U.S. PATENT DOCUMENTS

| | | | | |
|---|---|---|---|---|
| 3,249,323 A | * | 5/1966 | Vanderlip | B64C 29/0025 244/12.3 |
| 3,292,864 A | * | 12/1966 | Edkins | B64C 15/02 239/265.19 |
| 3,335,960 A | * | 8/1967 | Alderson | B64C 29/0016 239/265.27 |
| 3,397,852 A | * | 8/1968 | Sol | B64C 29/0025 244/12.3 |
| 3,451,645 A | * | 6/1969 | Wolcott | B64C 23/005 244/12.1 |
| 4,194,707 A | * | 3/1980 | Sharpe | B64C 3/141 244/12.3 |
| 4,469,294 A | * | 9/1984 | Clifton | B64C 29/0025 244/10 |
| 4,566,699 A | * | 1/1986 | Cucuzza | B64C 39/001 244/12.2 |
| 4,828,203 A | * | 5/1989 | Clifton | B64C 29/0025 244/12.3 |
| 5,738,302 A | * | 4/1998 | Freeland | B60V 1/15 180/116 |
| 6,109,565 A | * | 8/2000 | King, Sr. | B64C 3/141 244/12.1 |
| 6,123,296 A | * | 9/2000 | Mangalam | B64C 21/10 244/130 |

* cited by examiner

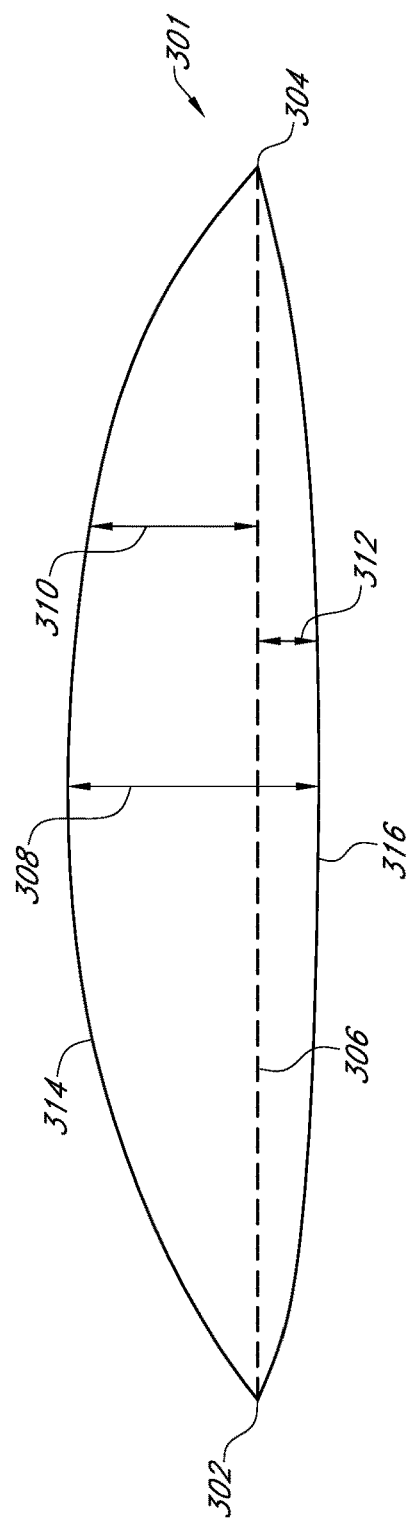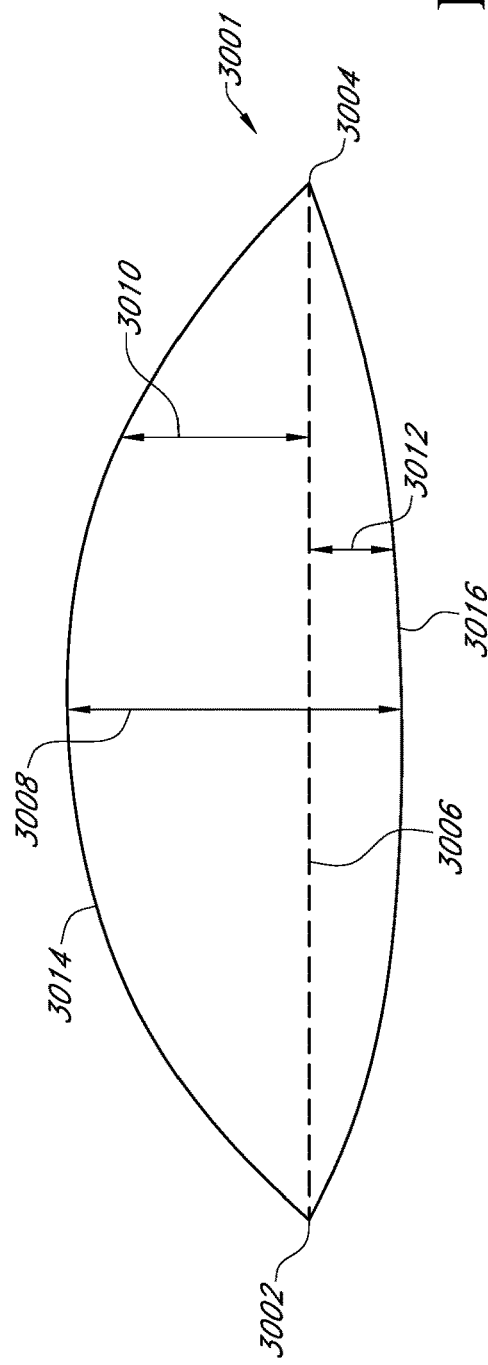

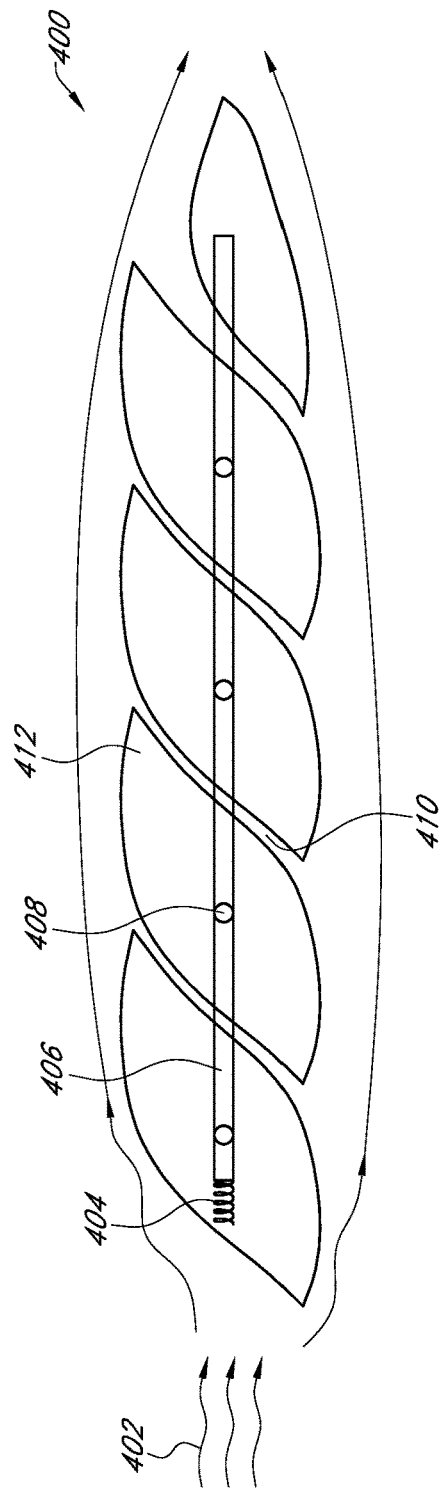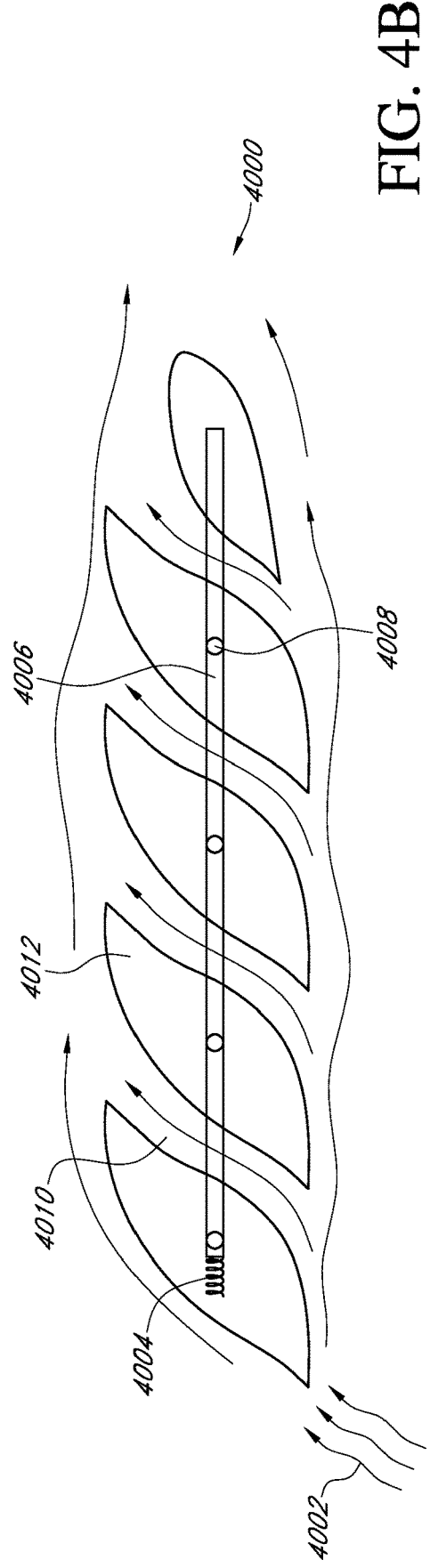
FIG. 4A
FIG. 4B

SYSTEMS, METHODS, AND APPARATUSES FOR AIRFOIL CONFIGURATION IN AIRCRAFT

FIELD

The present disclosure generally relates to airfoil systems for aircraft. More specifically, airfoil systems that allow for vertical takeoff and horizontal flight.

BACKGROUND

Aircraft rely on airfoils to create aerodynamic lift by creating a difference in pressure above and below the airfoil. On most airfoils, the upper surface is longer than the lower surface, thereby, causing faster airflow above the wing. This results in a lower pressure above the airfoil which causes lift. Generally, airfoils designed for slow flight have a larger upper surface in proportion to the lower surface which creates more lift, but also more drag. Airfoils that are designed for faster flight have a smaller upper surface in proportion to the lower surface and create less drag. High speed airfoils (See FIG. 1) require more power and do not perform well at low speeds.

At higher angles of attack (AOAs) separation of a boundary layer of air begins to occur at the aft upper section of the wing. The shape of the airfoil determines where, how, at what speed, and how abrupt this separation is. Once the critical AOA is reached, the airfoil will stall.

Blown wing resultant from induced airflow changes the relative airflow and can increase the allowable AOA from relative motion of the wing. This configuration requires higher power states to drive air over the airfoil with sufficient velocity to increase lift and inhibit boundary layer separation.

A glider airfoil is another solution. A wing with a long wingspan and short chord (fore and aft), allows for slower speeds. Additional system components such as dihedral wings, stall strips, and winglets are all aimed at achieving a balance between desired lift, stall, drag, and performance.

What is needed is an airfoil method and system that can adapt to various conditions which will maximize efficiency during low and high speed conditions. Essentially, a method and system that will combine the advantages seen in FIGS. 1A and 1B while minimizing the drawbacks.

SUMMARY

In one aspect, an adjustable airfoil system for an aircraft or other craft is disclosed. The adjustable airfoil system can include at least one airfoil. The adjustable airfoil system can include a plurality of louvers forming a portion of the airfoil. The adjustable airfoil system can include a connector configured to connect the plurality of louvers, wherein the plurality of louvers are configured to change conformation based on a force produced by an airflow.

In one aspect, a method to adjust the aerodynamic properties of an airfoil is disclosed. The method can include flowing air over an airfoil at a first rate. The method can include positioning a plurality of louvers to a first position, wherein the first position corresponds to a first thickness. The method can include flowing air over an airfoil at a second rate. The method can include repositioning the plurality of louvers to a second position, wherein the second position corresponds to a second thickness, wherein the first thickness and the second thickness are not the same.

In one aspect, an aircraft system configured for vertical takeoff and landing and horizontal flight is disclosed. The system can include a fuselage. The system can include at least one propeller affixed to the fuselage. The system can include an airfoil including at plurality of louvers, wherein the plurality of louvers are configured to change conformation based on a force produced by an airflow.

In one aspect, a fixed airfoil system is disclosed. The system can include an airfoil configured to generate a lift based on an angle of attack. The system can include a plurality of louvers forming a portion of the airfoil. The system can include a space between each of the plurality of louvers configured to flow an airflow wherein increasing the angle of attack increases the airflow.

In one aspect, a method of adjusting the aerodynamic properties of an airfoil is disclosed. The method can include flowing air over an airfoil at a first angle of attack to generate a first lift and a first drag. The method can include flowing air through a space at the first angle of attack. The method can include flowing air over an airfoil at a second angle of attack to generate a second lift and a second drag. The method can include flowing air through a space at the second angle of attack causing the second lift and the second drag to decrease relative to the first lift and the first drag.

BRIEF DESCRIPTION OF THE SEVERAL VIEWS OF THE DRAWINGS

For a more complete understanding of the principles disclosed herein, and the advantages thereof, reference is now made to the following descriptions taken in conjunction with the accompanying drawings in which:

FIG. 3A is an illustration of an airfoil system, including a louver system in a closed configuration, according to one of the various embodiments.

FIG. 3B is an illustration of an airfoil system, including a louver system in an open configuration, according to one of the various embodiments.

FIG. 4A is an illustration of an airfoil system, including a louver system in a closed configuration, according to one of the various embodiments.

FIG. 4B is an illustration of an airfoil system, including a louver system in an open configuration, according to one of the various embodiments.

While the present teachings are described in conjunction with various embodiments, it is not intended that the present teachings be limited to such embodiments. On the contrary, the present teachings encompass various alternatives, modifications, and equivalents, as will be appreciated by those skilled in the art.

Furthermore, in describing various embodiments, the specification may have present a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one of skill in the art can readily appreciate that the sequences may be varied and still remain within the spirit and scope of the various embodiments.

DETAILED DESCRIPTION OF THE EMBODIMENTS

Embodiments of systems, methods, and apparatuses for airfoil systems designed for aircraft or other craft are described in the accompanying description and figures. In the figures, numerous specific details are set forth to provide a thorough understanding of certain embodiments. A skilled artisan will be able to appreciate that the airfoil system described herein can be used in a variety of instruments and craft using wing systems and are not limited to aircraft. Additionally, the skilled artisan will appreciate that certain embodiments may be practiced without these specific details. Furthermore, one skilled in the art can readily appreciate that the specific sequences in which methods are presented and performed are illustrative and it is contemplated that the sequences can be varied and still remain within the spirit and scope of certain embodiments.

While the present teachings are described in conjunction with various embodiments, it is not intended that the present teachings be limited to such embodiments. On the contrary, the present teachings encompass various alternatives, modifications, and equivalents, as will be appreciated by those skilled in the art.

In order that the present disclosure may be more readily understood, certain terms are first defined.

As used herein "about" means plus or minus 20%, more preferably plus or minus 10%, even more preferably plus or minus 5%, most preferably plus or minus 2%.

As used herein "louver" means a component of an airfoil that may or may not be adjustable and contributes the size of an upper and lower surface of an airfoil.

Figure 1A:
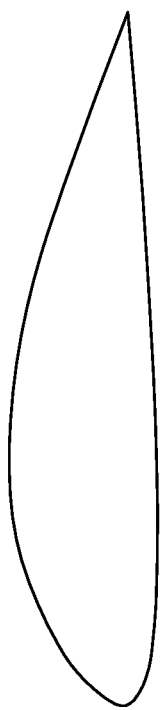
FIGS. 1A and 1B are illustrations of airfoil systems according to the prior art.
Figure 1B:

In the aerospace field various wing or airfoil designs are used for various applications. Generally, a single type of airfoil is designed for a single purpose. Referring to FIG. 1A, an illustration of a prior art design depicts an airfoil system adapted for low aircraft speed and high lift generation. Referring to FIG. 1B, an illustration of a prior art design depicts an airfoil system adapted for high aircraft speed and lower lift generation with the advantage of less drag. One example of an aircraft utilizing the airfoil depicted in FIG. 1A could be a low speed, unpowered aircraft. One example of an aircraft utilizing the airfoil depicted in FIG. 1B could be a higher speed propeller driven aircraft relying on increased airflow generation. An improved airfoil system could harness the advantages of both the airfoil systems disclosed in FIGS. 1A and 1B while minimizing the disadvantages.

Figure 2:
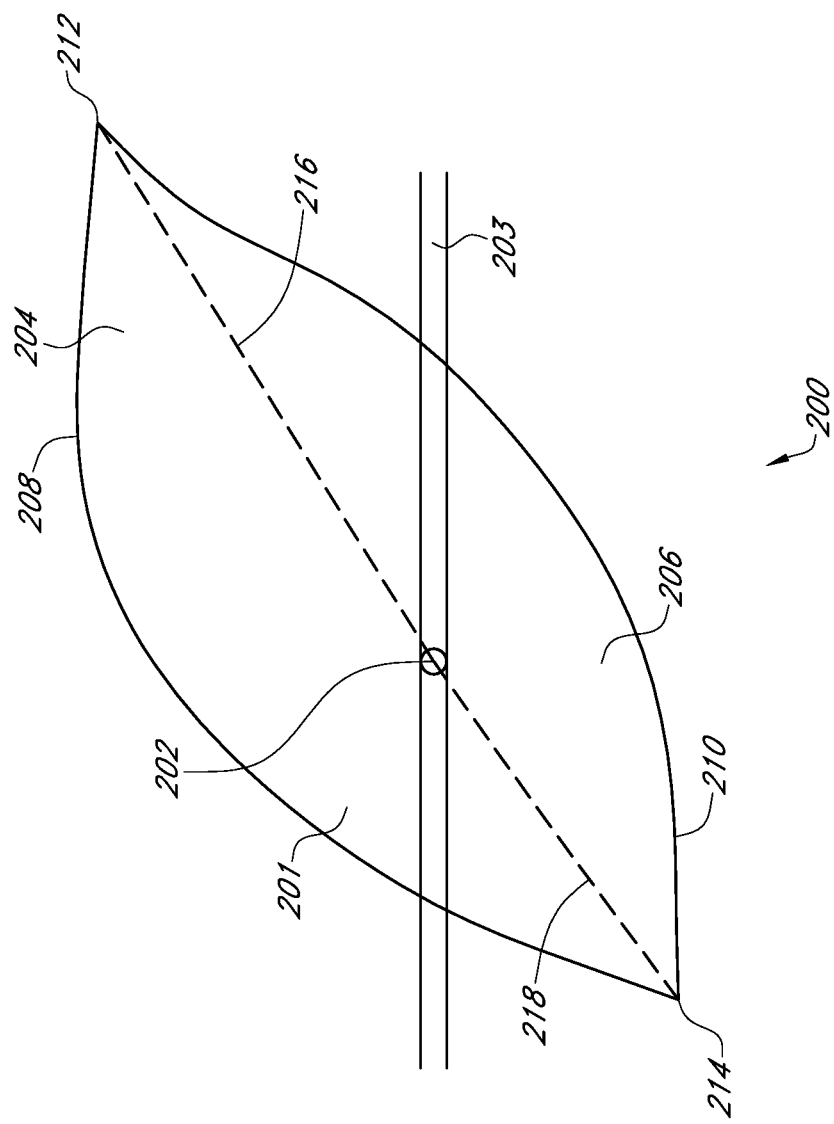
FIG. 2 is an illustration of a louver for an airfoil according to one of the various embodiments.

One embodiment of a solution to the problem presented in FIGS. 1A and 1B is a use of a louver system 200 in an airfoil system as illustrated in FIG. 2.

As shown FIG. 2, the louver system 200 comprises at least one attachment 202, at least one connector, 203, at least one upper louver 204, at least one lower louver 206, at least one surface of the upper louver 208, at least one surface of the lower louver 210, at least one upper end, at least one lower end, at least one upper length 216, and at least one lower length 218.

In various embodiments, the louver system 200 can comprise one or more attachments 202. The attachment 202 can function to attach one or more louvers 201 to one or more connectors 203. When in use, the louver system 202 can use one or more forces to position the louvers 201 in various positions. The connector 203 can be used to ensure that when more than one louver 201 is incorporated into the system they are positioned relative to one another.

In various embodiments, the louver 201 will have an upper end 212 and a lower end 214 that can be positioned based on a mechanical force in conjunction with an airflow. The louver 201 can be rotate around the axis or location of attachment 202.

In various embodiments, the louver 201 can have an upper length 216 and a lower length 218. In some embodiments the upper length 216 can be longer than the lower length 218. In some embodiments the upper length 216 can be the same as the lower length 218. In some embodiments the upper length 216 can be shorter than the lower length 218.

As shown in FIGS. 3A and 3B, the louver system 200 can be integrated into an airfoil to comprise a closed configuration 301 and an open configuration 3001. The airfoils depicted in FIGS. 3A and 3B comprise a leading edge 302 3002, a trailing edge 304 3004, a chord 306 3006, a thickness 308 3008, an upper camber 310 3010, a lower camber 312 3012, and an upper surface 314 2014. The two configuration depicted do not comprise all configurations as there are an infinite number of intermediate positions.

In various embodiments, a mechanical force can be overcome by a force generated by an airflow which can result in the louver system 200 configuring to change from an open configuration 3001 to a closed configuration 301 as seen in FIGS. 3A and 3B.

In various embodiments, the leading edge 302 and trailing edge 304 in the close configuration can stay in the same locations as the leading edge 3002 and the trailing edge 3004 in the open configuration 3001. In some embodiments, the chord length 306 in the open configuration 3001 can stay the same as the chord length 3006 in the closed configuration 3001.

In some embodiments, the airfoil thickness 308 is decreased in the closed configuration 301 when compared to the airfoil thickness 3008 in the open configuration 3001.

In various embodiments, the airfoil upper camber 310 and lower camber 312 are decreased in the closed configuration 301 as compared to the upper camber 3010 and lower camber 3012 in the open configuration 3001. In some embodiments the ratio of the upper camber 310 and lower camber 312 in the closed configuration 301 is the same, smaller or larger when compared to the ratio of the upper camber 3010 and lower camber 3012 in the open configuration 3001.

In various embodiments, the upper surface 314 and the lower surface 316 are both in the closed configuration 301 are both reduced when compared to the upper surface 3014 and the lower surface 3016 of the open configuration 3001.

As shown in FIGS. 4A and 4B, the louver system 200 can be integrated into an airfoil to comprise a closed configuration 400 and an open configuration 4000. FIG. 4 illustrates a detailed view of the inner workings of FIG. 3 and can comprise at least one mechanical force generator 404 4004, at least one connector 406 4006, at least one attachment 408 4008, at least one space 410 4010, and at least one louver 412 4012.

In various embodiments, the airflow direction caused by the angle of attack 402 over the airfoil in the close configuration 400 can overcome the mechanical force generator 404, thereby, causing the louvers 412 to rotate counter clockwise as depicted in FIGS. 4A and 4B. The connector 406 ensures that all the louvers 412 conform to their predefined positions aided through an attachment 408. In some embodiments, the space 410 in the close configuration 400 is narrow. Different louver systems can respond to different airflow forces based on the ratio of the upper length 216 to the lower length 218.

In various embodiments, the airflow direction caused by the angle of attack 4002 over the airfoil in the open configuration 4000 can fail to overcome the mechanical force generator 4004, thereby, causing the louvers 4012 to rotate clockwise as depicted in FIGS. 4A and 4B. In some embodiments, the space 4010 in the open configuration 4000 is wider than the space 410 in the closed configuration 400. In various embodiments, the airfoil can comprise a shroud or a skin configured to cover the space 410.

In various embodiments, the mechanical force generator 404 can comprise at least one spring, at least one pneumatic device, at least one screw, at least one electrical actuator, or at least one hydraulic device.

In various embodiments, the louver systems 200 in FIGS. 4A and 4B can be fixed instead of adjustable as depicted in previous embodiments. In such systems, airfoil properties are dependent on the angle of attack. For example, the angle of attack 402 would result in efficient lift and decreased drag. The angle of attack 4002 seen in FIG. 4B on the same air foil would result in decreased separation of a boundary layer than would normally occur using conventional airfoil systems. This occurs due to the space 410 4010 provided by the louver system 200. Such louver systems 200 presented herein have a broader dynamic range than convention airfoil systems. During cruise flight airflow can bypass the spaces 410 4001 or channels due to Venturi effect. During takeoff, climbing, and landing (high AOA) more air can flow through the spaces 410 4010 or channels, thereby, increasing lift over the airfoil or wing and decreasing boundary layer separation.

Figure 5:
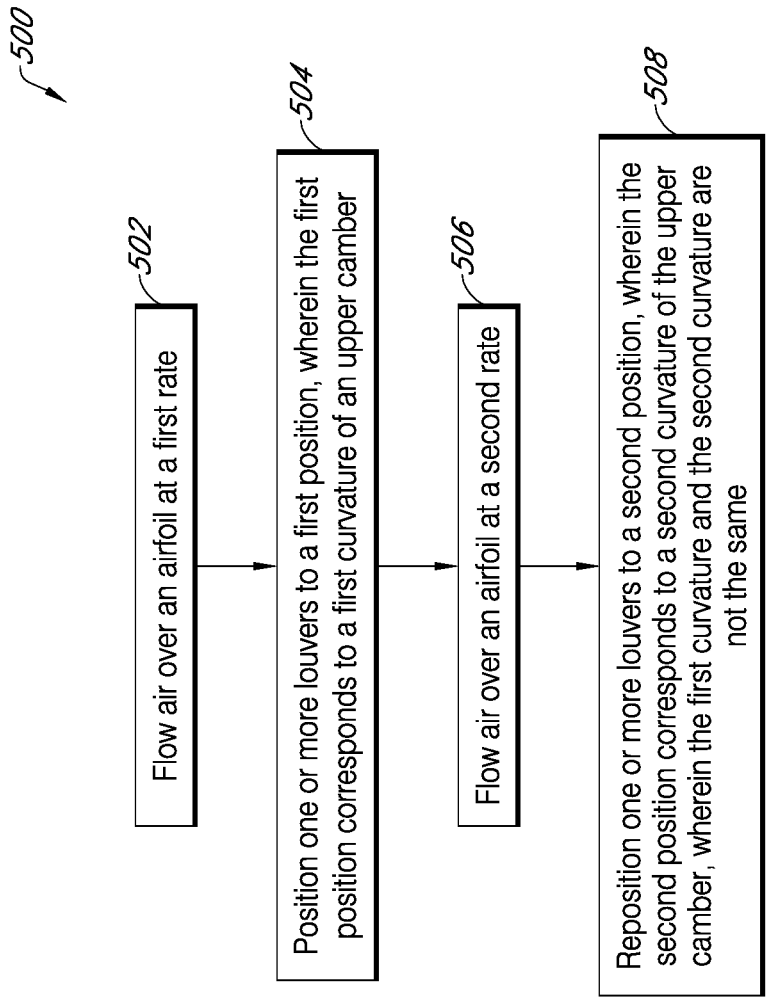
FIG. 5 is an illustration of a flow diagram according to one of the various embodiments.

FIG. 5 is an exemplary flowchart showing a method 500 for utilization of a louver system in an airfoil.

In step 502, air flows over an airfoil at a first rate. In step 504, one or more louvers are positioned to a first position, wherein the first position corresponds to a first thickness. In step 506, air flows over an airfoil at a second rate. In step 508, the one or more louvers can be repositioned, wherein the second position corresponds to a second thickness, wherein the first thickness and the second thickness are not the same.

In various embodiments, an additional step can include flowing air through a space between two of the plurality of louvers.

In various embodiments, an additional step can include positioning a connector 406 4006 to a first position. Another additional step can include positioning the connector 406 4006 to a second position. The connector can be affixed to each of the plurality of louvers to ensure that each of the plurality of louvers configures to a conformation relative to each of the other louvers.

In various embodiments, flowing airflow at the second rate generates a force to overcome a mechanical force. The mechanical force can be created by a mechanical force generator 404 4004. In some embodiments, the mechanical force can be generated by a spring, pneumatic device, electrical device, hydraulic device, or any other device known or useful in the art.

In various embodiments, the second airflow rate can be greater than the first airflow rate and the first thickness can be greater than the second thickness. In some embodiments, the overall airfoil can have more curvature at the first airflow rate compared to the second airflow rate.

Figure 6:
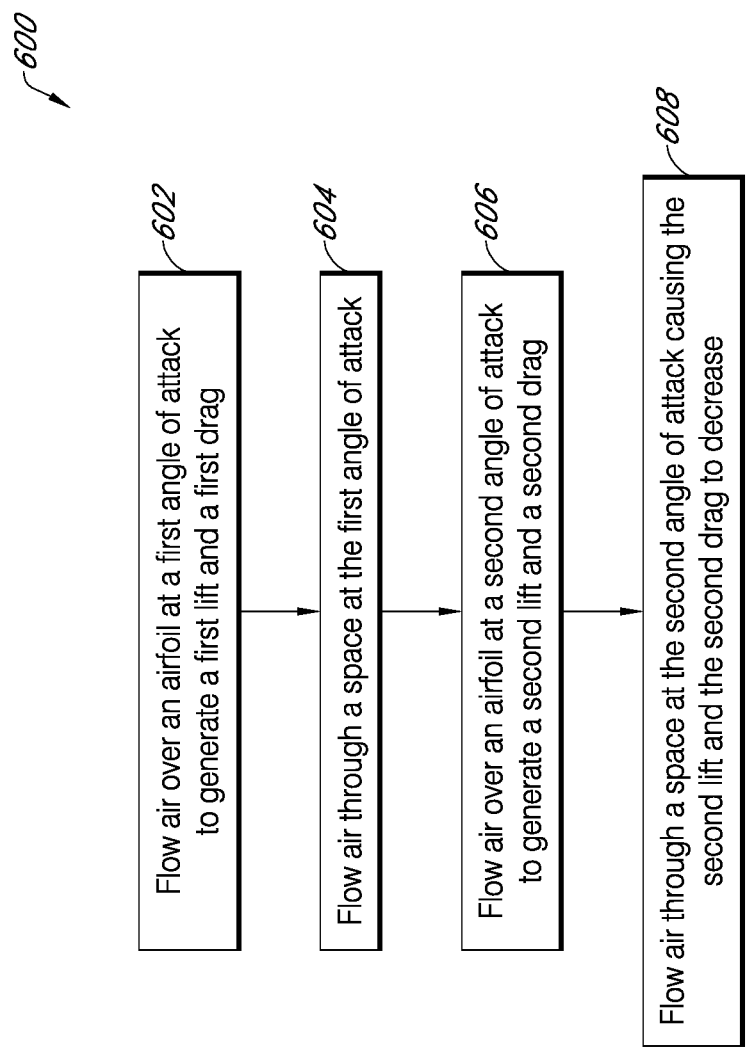
FIG. 6 is an illustration of a flow diagram according to one of the various embodiments.

FIG. 6 is an exemplary flowchart showing a method 600 for utilization of a fixed louver system in an airfoil. Such an embodiment does not allow for adjustable louvers and lift and drag properties change according to the angle of attack.

In step 602, air flows over an airfoil at a first angle of attack to generate a first lift and a first drag. In step 604, air flows through a space at the first angle of attack. In step 606, air flows over an airfoil at a second angle of attack to generate a second lift and a second drag. In step 608, air flows through a space at the second angle of attack causing the second lift and the second drag to decrease.

In various embodiments, air does not flow through the space at the first angle of attack or can flow through at a much lower rate than at the second angle of attack.

In various embodiments, an additional step can include decreasing flow separation by increasing airflow through the space.

As shown in FIGS. 4A and 4B, the louver system 200 can be integrated into an airfoil to comprise a closed configuration 400 and an open configuration 4000. FIG. 4 illustrates a detailed view of the inner workings of FIG. 3 and can comprise at least one mechanical force generator 404 4004, at least one connector 406 4006, at least one attachment 408 4008, at least one space 410 4010, and at least one louver 412 4012.

Figure 7:
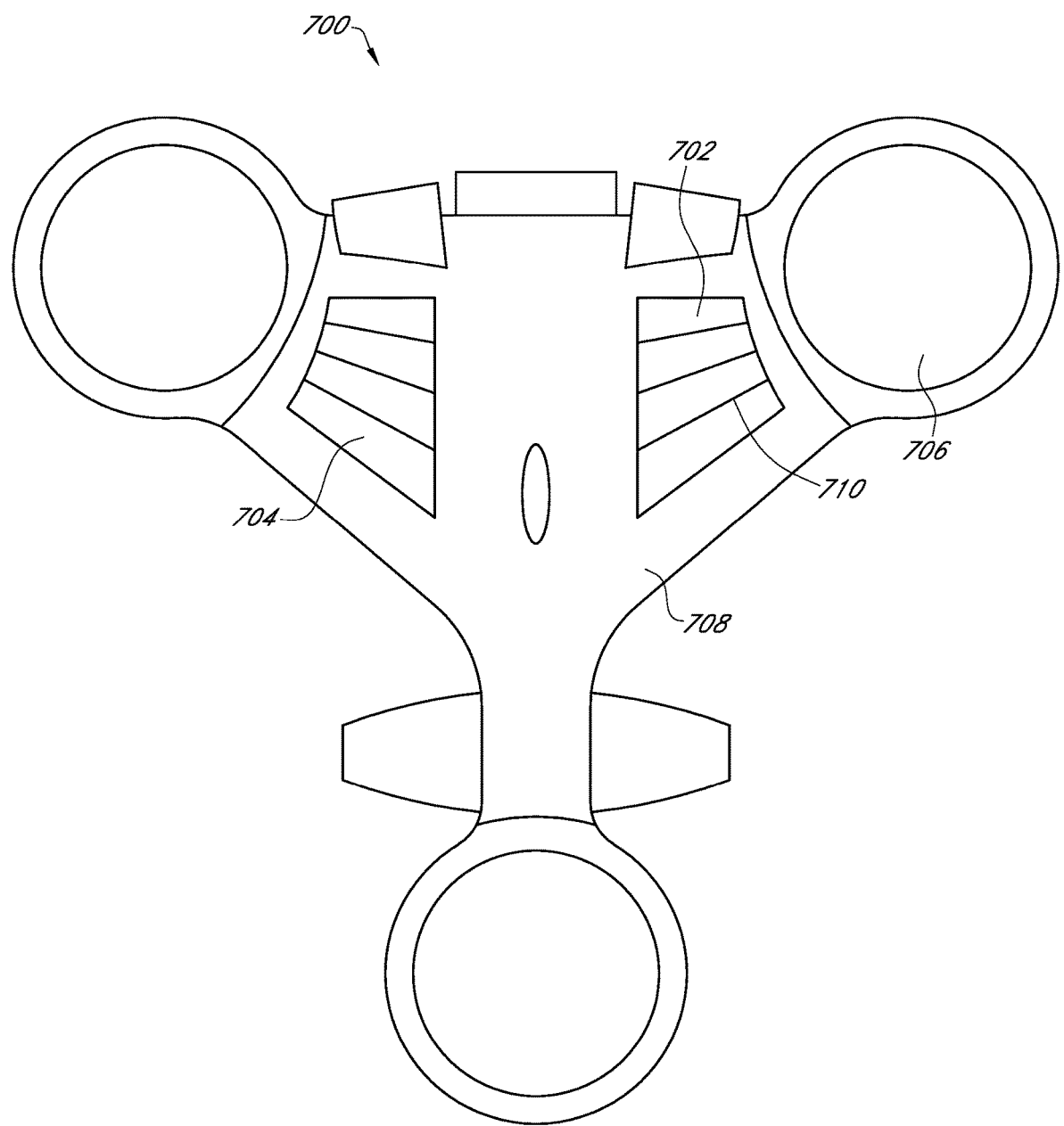
FIG. 7 is an illustration of an aircraft system including the louvre system described herein.

As shown in FIG. 7, an aircraft system 700 can incorporate a louver system to increase the efficiency of for vertical takeoff and landing and horizontal flight. The aircraft system 700 can comprise at least one louver fuselage 708, at least one propeller 706, at least one airfoil 704 that can include at least one louver 702, wherein the at least one louver is configured to change conformation based on a force produced by an airflow.

In various embodiments, the aircraft system 700 can incorporate the teachings of the louver system 200 disclosed herein.

In various embodiments, the propeller can be shrouded.

While the present teachings are described in conjunction with various embodiments, it is not intended that the present teachings be limited to such embodiments. On the contrary, the present teachings encompass various alternatives, modifications, and equivalents, as will be appreciated by those skilled in the art.

The invention claimed is:

1. An adjustable airfoil system comprising:
   an airfoil having a thickness and a plurality of spaces, wherein each space extends across the thickness of the airfoil;
   a plurality of louvers forming a portion of the airfoil and a distance between adjacent louvers defines a width of the spaces;
   a connector configured to connect the plurality of louvers, wherein the plurality of louvers are configured to change between a closed conformation and an open conformation based on a force produced by an airflow, wherein the airfoil thickness in the closed conformation is less than the airfoil thickness in the open conformation, wherein the plurality of louvers are affixed to the connector with an attachment and the plurality of louvers rotate on an axis located at the position of the attachment;
   a mechanical force generator, wherein the mechanical force generator is connected to the connector and is configured to resist the force produced by the airflow; and the mechanical force generator is a spring, a pneumatic device, an electric device, or a hydraulic device, wherein the mechanical force generator is positioned inside the connector and shares the same longitudinal axis.

2. The system of claim 1 wherein each of the plurality of louvers includes an upper louver and a lower louver.

3. The system of claim 2 wherein a portion of the upper louvers forms a portion of an upper camber of the airfoil and a portion of the lower louvers forms a portion of a lower camber of the airfoil.

4. The system of claim 3 wherein changing the conformation of the plurality of louvers changes an airfoil curvature.

5. The system of claim 1 further comprising a space configured to flow air between the louvers.

6. The system of claim 2 wherein a ratio of an upper length of the upper louver to a lower length of the lower louver is in the range of about 60/40 to about 70/30.

7. The system of claim 2 wherein a ratio of an upper length of the upper louver to a lower length of the lower louver is in the range of about 50/50 to about 80/20.

8. An adjustable airfoil system comprising:
an airfoil having a first surface and a second surface;
a plurality of louvers forming a portion of the airfoil, wherein each louver includes an upper portion and a corresponding lower portion, wherein the upper portions form the first surface and the lower portions form the, second surface;
a space having a length and a width, wherein the length extends between the first surface and the second surface and the width extends between adjacent louvers; and
a connector configured to connect the plurality of louvers, wherein the plurality of louvers are configured to change conformation between a closed conformation and an open conformation, wherein the first and second surfaces each have a greater curvature in the open configuration relative to the closed configuration, wherein each of the plurality of louvers is affixed to the connector with an attachment, wherein each louver is rotatable about the attachment;
a mechanical force generator, wherein the mechanical force generator is connected to the connector and is configured to resist the force produced by the airflow; and
the mechanical force generator is a spring, a pneumatic device, an electric device, or a hydraulic device, wherein the mechanical force generator is positioned inside the connector and shares the same longitudinal axis.

9. The adjustable airfoil system of claim 8, wherein adjacent louvers are in physical communication when in the closed configuration.

10. An adjustable airfoil system of comprising:
an airfoil having a first surface and a second surface, wherein a plurality of spaces extend between the first and second surfaces;
a plurality of louvers forming a portion of the airfoil and the distance between adjacent louvers determines a width of the spaces; and
a connector configured to connect the plurality of louvers, wherein each of the plurality of louvers is affixed to the connector with an attachment, wherein each louver is rotatable about the attachment;
a mechanical force generator, wherein the mechanical force generator is connected to the connector and is configured to resist the force produced by the airflow; and
the mechanical force generator is a spring, a pneumatic device, an electric device, or a hydraulic device, wherein the mechanical force generator is positioned inside the connector and shares the same longitudinal axis.

11. The system of claim 10, wherein rotation of the louvers about the attachment changes a thickness of the airfoil.

* * * * *